United States Patent
Yagihashi et al.

(10) Patent No.: US 7,454,953 B2
(45) Date of Patent: Nov. 25, 2008

(54) INTERNAL COMBUSTION ENGINE CONTROL APPARATUS

(75) Inventors: Nobuo Yagihashi, Nishikamo-gun (JP); Yoshito Aibara, Kobe (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 60 days.

(21) Appl. No.: 11/486,009

(22) Filed: Jul. 14, 2006

(65) Prior Publication Data
US 2007/0012285 A1    Jan. 18, 2007

(30) Foreign Application Priority Data
Jul. 15, 2005    (JP)    ............... 2005-207692

(51) Int. Cl.
*G01M 15/00*    (2006.01)
(52) U.S. Cl. .................. 73/35.05; 73/35.01; 73/35.03; 73/35.06; 73/35.16
(58) Field of Classification Search .................. 73/116, 73/117.2, 117.3, 118.1, 35.01, 35.03, 35.05, 73/35.06, 35.16; 123/339.11, 339.14; 60/284, 60/285; 701/103
See application file for complete search history.

(56) References Cited

U.S. PATENT DOCUMENTS

| | | | | |
|---|---|---|---|---|
| 4,399,789 A | * | 8/1983 | Yano | ............. 123/339.11 |
| 4,425,886 A | * | 1/1984 | Kuroiwa et al. | ......... 123/339.24 |
| 4,688,534 A | * | 8/1987 | Takeda et al. | .......... 123/339.24 |
| 5,586,534 A | * | 12/1996 | Fujimoto | .............. 123/325 |
| 6,116,213 A | * | 9/2000 | Yasui et al. | ............. 123/339.11 |
| 6,189,317 B1 | * | 2/2001 | Yasui et al. | .............. 60/284 |
| 6,513,489 B2 | * | 2/2003 | Osanai | .............. 123/339.11 |
| 6,843,225 B1 | * | 1/2005 | Ise | ................. 123/339.11 |
| 6,997,160 B2 | * | 2/2006 | Oi et al. | .............. 123/339.11 |
| 2005/0166894 A1 | * | 8/2005 | Oi et al. | .............. 123/339.11 |
| 2007/0174003 A1 | * | 7/2007 | Ueno et al. | ............. 701/104 |

FOREIGN PATENT DOCUMENTS

| | | |
|---|---|---|
| JP | 9-68084 | 3/1997 |
| JP | 11-182302 | 7/1999 |
| JP | 11-210608 | 8/1999 |

* cited by examiner

*Primary Examiner*—Edward Lefkowitz
*Assistant Examiner*—Freddie Kirkland, III
(74) *Attorney, Agent, or Firm*—Oblon, Spivak, McClelland, Maier & Neustadt, P.C.

(57) ABSTRACT

An internal combustion engine control apparatus controls an air intake mass at an idle state after a start of an internal combustion engine based on a correction mass of the air intake mass calculated based on a desired value of the air intake mass and a measured value of the air intake mass. The air intake mass is controlled based on an idle speed control variable corresponding to the desired value of the air intake mass, and an idle speed control variable at when the correction mass is calculated. Each idle speed control variable includes a degree of a throttle opening or a degree of an idle speed control valve opening.

16 Claims, 5 Drawing Sheets

INTERNAL COMBUSTION ENGINE CONTROL APPARATUS

BACKGROUND OF THE INVENTION

1. Field of the Invention

The present invention relates to an internal combustion engine control apparatus.

2. Description of the Related Art

Japanese Patent Application Laid-Open (JP-A) No. H11-210608 discloses an internal combustion engine control apparatus which activates a catalytic converter to maintain desired purification performance soon after an internal combustion engine starts. According to the control apparatus, controllability and stability of the rotational speed of the internal combustion engine are improved by an intake air mass more than that at a normal idle state and feedback control of an ignition timing so as to maintain a desired engine speed during a period after the engine starts. Specifically, the control apparatus includes an air intake mass control unit and an ignition timing control unit. The air intake mass control unit increases the air intake mass at an idle state where exhaust gas is discharged through the catalytic converter after the engine starts, by a predetermined mass from an air intake mass at the normal idle. The ignition timing control unit retards the ignition timing by controlling the ignition timing based on a command value which is generated by a feedback control in which the rotational speed of the internal combustion engine is maintained at the desired speed after the air intake mass control unit starts increasing the air intake mass. The air intake mass control unit also includes a unit that decreases the increase in the air intake mass when the command value generated by the feedback control indicates a spark angle retarded from a retard threshold, which is set within a predetermined allowable range of the ignition timing capable of normally operating the internal combustion engine.

In the internal combustion engine control apparatus of JP-A No. H11-210608, when the command value of the ignition timing is advanced from the threshold described above, a correction mass by which the increase in the air intake mass is decreased is set as a current correction mass. Further, the air intake mass control unit sets the increase, which is not corrected, of the air intake mass in accordance with a temperature of the internal combustion engine. Further, the air intake mass control unit gradually increases the increase, which is not corrected, of the air intake mass right after the engine starts. The air intake mass control unit also gradually decreases the increase, which is not corrected, of the air intake mass in a predetermined way with time after a predetermined time is passed from the start of the control for increasing the air intake mass.

It is desired that the correction mass (controlled variable) of the air intake mass after the internal combustion engine starts is set to a more appropriate value. There are described here two cases where the correction mass is set to an inappropriate value.

One case is as follows. In the internal combustion engine control apparatus of JP-A No. H11-210608, the air intake mass control unit gradually decreases the increase, which is not corrected, of the air intake mass in the predetermined way with time after the predetermined time is passed from the start of the control for increasing the air intake mass. However, excess and deficiency in the air mass might be caused at a middle temperature of the internal combustion engine while warming up the internal combustion engine. An error in the air intake mass is caused by the air intake mass decreased due to a property of an idle speed control valve (ISCV) or a property of a throttle valve (change in properties with time), mainly depending on the opening angle of the valve. Hence, decreasing the increase in the air mass with time causes an inconsistency.

The other case is as follows. In the internal combustion engine control apparatus of JP-A No. H11-210608, the air intake mass is increased and decreased based on the command value of the ignition timing generated by an ignition feedback (F/B) control. However, the command value of the ignition timing also depends on a fuel property, an engine friction, and the like. For example, when a heavy fuel is used, an air/fuel ratio is lean, so that an output torque is decreased and an engine speed is decreased. Consequently, the ignition timing is advanced by the ignition feedback control. In the internal combustion engine control apparatus, an excessive air mass might be obtained since the air mass might be increased when the ignition timing is advanced. The engine speed differs from a desired speed not only because of the excess and the deficiency of the air intake mass, but because of the fuel property, the engine friction, and the like. Hence, the air intake mass might be excessively corrected when the air intake mass is increased and decreased based on the command value of the ignition timing. Therefore, it is considered to obtain the correction mass of the air intake mass based on a deficient mass. Here, the excess and the deficiency of an actual air mass with respect to the desired air mass is detected by directly measuring an actual air intake mass, and the deficient mass is obtained when the actual air mass is deficient with respect to the desired air mass. However, in the process described above, the ignition timing might not be stabilized at the desired value when a measuring instrument for directly measuring the actual air intake mass has an error (including manufacturing error) since the air intake mass is excessively corrected.

An object of the present invention is to provide an internal combustion engine control apparatus in which a correction mass of an air intake mass after an internal combustion engine starts is set to a more appropriate value.

SUMMARY OF THE INVENTION

An internal combustion engine control apparatus according to one aspect of the present invention controls an air intake mass at an idle state after a start of an internal combustion engine based on a correction mass of the air intake mass calculated based on a desired value of the air intake mass and a measured value of the air intake mass. The internal combustion engine control apparatus controls the air intake mass based on an idle speed control (ISC) variable corresponding to the desired value of the air intake mass, and based on an ISC variable at when the correction mass is calculated. Each ISC variable includes a throttle opening or an ISCV opening.

An internal combustion engine control apparatus according to another aspect of the present invention controls an air intake mass at an idle state after a start of an internal combustion engine based on a correction mass calculated based on a measured value of the air intake mass. The internal combustion engine control apparatus controls the air intake mass based on a water temperature of the internal combustion engine.

In the internal combustion engine control apparatus, a control variable of the air intake mass may be decreased when a rotational speed of the internal combustion engine is greater than a desired rotational speed by at least a predetermined value.

An internal combustion engine control apparatus according to still another aspect of the present invention controls an air intake mass at an idle state after a start of an internal combustion engine based on a correction mass calculated based on a measured value of the air intake mass. The internal combustion engine control apparatus prohibits a control for increasing the air intake mass when a feedback correction mass of an ignition timing is retarded while performing a feedback control of the ignition timing in which a rotational speed of the internal combustion engine converges to a desired value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A first embodiment of an internal combustion engine control apparatus of the present invention will be described in detail below with reference to FIGS. 1 to 6.

Figure 1:
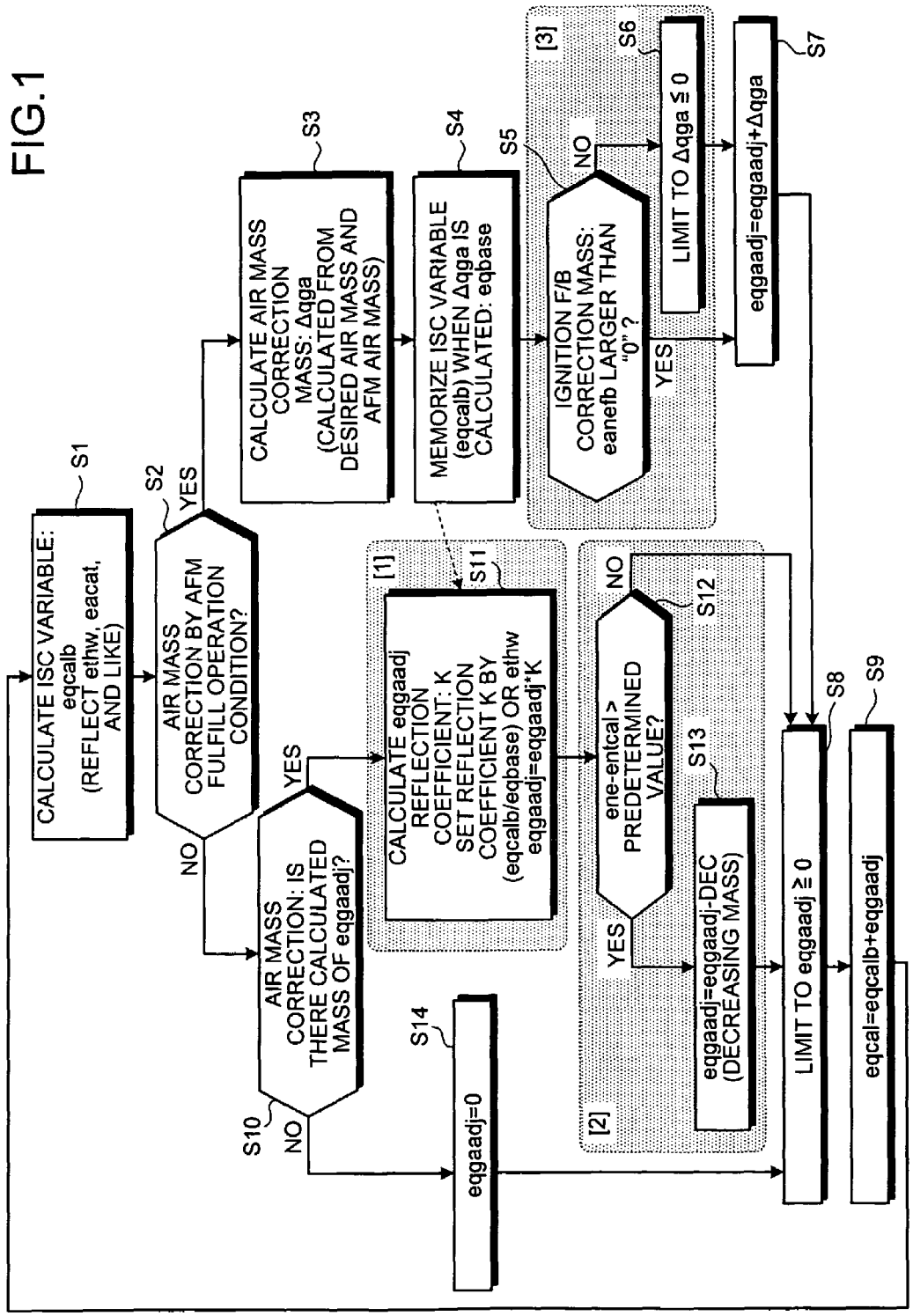
FIG. 1 is a flow chart showing an operation of a first embodiment of an internal combustion engine control apparatus of the present invention.
Figure 5:
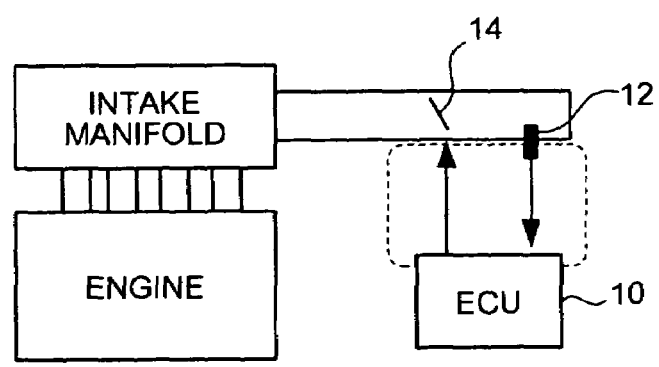
FIG. 5 is a block diagram schematically showing a configuration when the first embodiment of the internal combustion engine control apparatus of the present invention is applied.

As shown in FIGS. 1 and 5, an internal combustion engine control apparatus 10 of the present embodiment controls an air intake mass by controlling a throttle opening 14 (step S9). The throttle opening 14 is controlled based on a correction mass of the air intake mass eqgaadj that is calculated (step S11) based on a value of the air intake mass measured by an air flow meter (AFM) 12 at an idle state after the engine starts.

The internal combustion engine control apparatus 10 calculates the correction mass of the air intake mass (Δqga, eqgaadj) at the idle state after the start of the engine based on a desired value of the air intake mass and the measured value of the air intake mass, and controls the air intake mass based on the calculated correction mass (Δqga, eqgaadj). Here, the internal combustion engine control apparatus 10 controls the air intake mass (steps S11 and S9) based on an idle speed control (ISC) variable (eqcalb, step S1) including a throttle opening or an idle speed control valve (ISCV) opening corresponding to the desired value of the air intake mass, as well as based on the ISC variable at when the correction mass (Δqga) is calculated (eqbase, step S4):

The internal combustion engine control apparatus 10 calculates the correction mass (Δqga, eqgaadj) of the air intake mass based on the measured value of the air intake mass at the idle state after the start of the engine, and the internal combustion engine control apparatus 10 controls the air intake mass based on the calculated correction mass (Δqga, eqgaadj). Here, the internal combustion engine control apparatus 10 controls the air intake mass based on a water temperature ethw of the internal combustion engine (steps S11 and S9).

The internal combustion engine control apparatus 10 decreases (step S13) a controlled variable of the air intake mass (eqgaadj) when an internal combustion engine speed (ene) is greater than a desired speed (entcal) by at least a predetermined value (step S12, Yes).

The internal combustion engine control apparatus 10 calculates the correction mass (Δqga, eqgaadj) of the air intake mass at the idle state after the start of the engine based on the measured value of the air intake mass, and the internal combustion engine control apparatus 10 controls the air intake mass based on the calculated correction mass (Δqga, eqgaadj). Here, the internal combustion engine control apparatus 10 prohibits a control for increasing the air intake mass (steps S6 and S7) when a feedback correction mass of the ignition timing is retarded (step S5, No) while performing a feedback control of the ignition timing in such a way that the internal combustion engine speed converges to the desired value (step S2, Yes).

The internal combustion engine control apparatus 10 of the present embodiment performs the following three controls, (1) to (3).

(1) An influence based on the ISC variable or the engine water temperature is reflected to the correction mass eqgaadj of the air intake mass (step S11). Specifically, the correction mass of the air intake mass eqgaadj is calculated (step S11) by multiplying a value by a reflection coefficient K. Here, the value is set based on the difference Δqga (step S3) between the desired air mass and the value of the air intake mass measured by the AFM, and the reflection coefficient K is set based on the ISC variable or the engine water temperature (step S7). Consequently, the correction mass of the air intake mass eqgaadj can be decreased (step S11) compared with the value (step S7) set based on Δqga (step S3). Hence, a property of the ISC or a property of the throttle valve (change in properties with time) is considered, and the excess and the deficiency in the air intake mass is suppressed.

Here, the ISC is performed by a throttle opening when an electronic throttle is used, and by an ISCV when a mechanical throttle is used.

(2) When the engine speed ene has been greater than or equal to the desired engine speed entcal by the predetermined value while performing the correction of the air intake mass (step S12, Yes), the correction mass of the air intake mass eqgaadj is recalculated or decreased (step S13). Consequently, the engine speed approaches to the desired engine speed entcal, and as a result, the excessive sucking of the air mass is suppressed.

(3) When the correction mass of the feedback control of the engine speed by the ignition timing (ignition feedback control) is controlled to the retarded side (FIG. 2, the ignition feedback correction mass eanefb is less than or equal to zero) (step S5, No), the correction for increasing the air intake mass is prohibited (steps S6 and S7). The correction for increasing the air intake mass is prohibited in order to avoid decreasing an excessive mass due to the retarded side control of the ignition timing. Here, the excessive mass is caused since the engine speed exceeds the desired value due to the correction for increasing the air intake mass. Consequently, the engine speed and the ignition timing are stabilized at the desired value even if a measuring instrument for directly measuring the actual air intake mass has an error (including a manufacturing error).

In the present embodiment, the ignition feedback control feedback-controls the ignition timing in such a way that the speed of the internal combustion engine converges to the desired speed while increasing the air intake mass of the internal combustion engine with respect to a normal idle state in order to quickly activate a catalytic converter and to obtain a desired purification performance after the start of the internal combustion engine. Further, the ISC variable corresponds to the throttle opening angle or the ISCV opening angle (degree) that is set to suck a predetermined requested flux (L/s) of the air intake mass where the requested flux (L/s) and the throttle opening angle or the ISCV opening angle (degree) have one-to-one correspondence.

Normally, other than when it is cold, that is to say when the ignition feedback control is stopped, the ISC variable is determined by the feedback control due to the engine speed. As a prerequisite condition of the present embodiment, the air intake mass after the engine is warmed up is corrected (see openings θ1, θ2 of FIG. 6) by the feedback control (or learning) of an idle rotation even if the property of the ISC (electronic throttle) is shifted as function of time and the like.

A problem in a conventional control apparatus will now be explained below with reference to FIG. 6.

Figure 6:
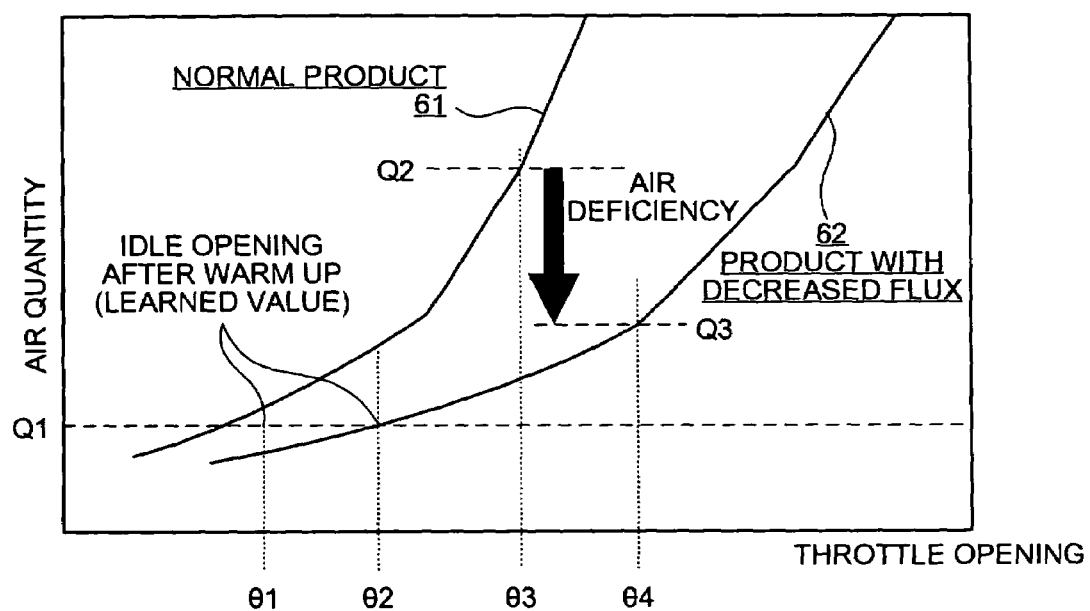
FIG. 6 is a graph showing a relationship between a throttle opening property of a conventional normal product and a throttle opening property of a product with decreased flux.

FIG. 6 shows an error due to the property of the electronic throttle. In FIG. 6, reference character 61 represents a property of a normal product, and reference character 62 represents a property of a product with decreased flux due to change over time. Further, Q1 represents the air intake mass necessary after the warm up, and Q2 represents the air intake mass necessary when it is cold. For the normal product (61), the control apparatus memorizes the throttle opening θ1 necessary for sucking the air mass (Q1) necessary at the warm up. Further, the control apparatus learns and memorizes the throttle opening θ2 necessary for sucking the air mass Q1 even after the flux is decreased (62) due to the change over time. That is to say, the control apparatus after the flux is decreased due to the change over time (62) learns and memorizes to set the opening larger by θ2-θ1 with respect to the normal product (61) in order to suck the air mass Q1 necessary after the warm up.

On the other hand, the throttle opening for sucking the air mass necessary when it is cold will be explained below. The control apparatus memorizes a throttle opening θ3 necessary for sucking the air mass Q2 necessary when it is cold. However, the air mass for the product with decreased flux due to the change over time (62) is deficient by Q2-Q3 when the throttle opening is set θ2-θ1 larger than θ3. The deficiency in the air mass is caused because θ2-θ1 is the throttle opening necessary to be added to θ1 after the warm up. Therefore, the throttle opening when it is cold of the product with decreased flux (62) is only θ4 (=θ3+θ2−θ1), and the deficiency occurs.

As described above, the ISC variable is normally, other than when it is cold, that is to say when the ignition feedback control is stopped, determined by the feedback control due to the engine speed. In the present embodiment, the engine speed is controlled by the ignition feedback control when it is cold, and the ISC variable (ISC opening) is corrected by the air intake mass measured by the AFM (air mass correction mass Δqga of step S3 described later).

An operation of the present embodiment will be explained in detail below with reference to FIG. 1. In FIG. 1, (1) to (3) correspond to those described above as the control of the present embodiment.

In step S1 of FIG. 1, the ISC variable (corresponding to the throttle opening) eqcalb is calculated based on the engine water temperature ethw, an retard ignition mass eacat, and an external load. The ISC variable eqcalb when the engine is driven at cold is set to be larger than the ISC variable eqcalb in a normal state due to setting a high idle speed as well as controlling the ignition timing to retard since an emission (catalyst warm up) and an idle stability are requested. Then, the ISC variable obtained at step S1 becomes smaller than the ISC variable obtained at step S1 when it is cold, as the warm up proceeds.

In step S2, it is determined whether or not an operation condition of the correction of the air intake mass using the AFM is fulfilled. Specifically, it is determined whether or not the ignition feedback control is in operation. The ignition feedback control is performed right after the cold start and before the warm up; therefore, step S2 determines whether or not the internal combustion engine is in a state right after the cold start and before the warm up.

Here, step S2 can determine whether or not the internal combustion engine is in a predetermined period of time after the cold start thereof. When the operation condition of the correction of the air intake mass using the AFM is fulfilled as a result of step S2 (step S2, Yes), a control cycle of the internal combustion engine proceeds to step S3. On the other hand (step S2, No, including the warm up process), the control cycle proceeds to step S10.

In step S3, the air mass correction mass Δqga is obtained as a difference between the desired air mass and the air intake mass measured by the AFM. Here, the desired air mass is obtained based on the ISC variable eqcalb obtained in step S1 described above and based on the engine speed.

As described later, the air mass correction mass eqgaadj is obtained based on the air mass correction mass Δqga obtained in step S3 (step S7). In the control apparatus of JP-A No. H11-210608 as described above, the air intake mass is increased and decreased based on a command value of the ignition timing generated by the ignition feedback control. However, the command value of the ignition timing changes due to a fuel property, engine friction, and the like. For example, when a heavy fuel is used, the air/fuel ratio is lean, so that an output torque is decreased and the engine speed is decreased. Hence, the ignition timing is set to the advanced side, as a part of the ignition feedback control. In the control apparatus of JP-A No. H11-210608, the air mass might be increased when the ignition timing is set to the advanced side so that an excessive air mass might be obtained. The engine speed differs from the desired speed not only because of the excess and the deficiency of the intake air mass, but because of the fuel property, the engine friction, and the like. Therefore, when the air intake mass is increased and decreased based on the command value of the ignition timing, the air intake mass might be excessively corrected.

On the other hand, the present embodiment can detect whether or not the actual air mass is sufficient with respect to the desired air mass by directly measuring the air intake mass by the AFM. Further, the present embodiment can obtain the deficient mass as the air mass correction mass Δqga when the actual air mass is insufficient (step S3), and the correction mass of the air intake mass eqgaadj is obtained based on the air mass correction mass Δqga (step S7). Hence, the excessive correction of the air intake mass can be suppressed even if the command value of the ignition timing by the ignition feedback control fluctuates due to the fuel property, the engine friction, and the like. The control cycle proceeds to step S4 after step S3.

In step S4, the ISC variable eqcalb at when the air mass correction mass Δqga is obtained in step S3 is memorized as data eqbase. The control cycle proceeds to step S5 after step S4.

Step S5 determines whether or not the ignition feedback correction mass eanefb (FIG. 2) is larger than zero. That is to say, step S5 determines whether or not the ignition timing is advance-controlled by the ignition feedback control. Thus, the control cycle proceeds to step S7 when the ignition feedback correction mass eanefb is larger than zero (step S5, Yes). Consequently, the air mass correction mass Δqga obtained at step S3 is added to the value of the air mass correction value eqgaadj of the previous air intake mass to renew the air mass correction value eqgaadj of the air intake mass (correction for increasing the air intake mass). On the other hand, when the result of the step S5 is No, the control cycle proceeds to step S6. Here, the air mass correction mass Δqga is suppressed to a value of less than or equal to zero, and the correction for increasing the air intake mass is prohibited (step S7). The operation of steps S5 to S7 described above will be explained below.

It is an prerequisite condition that the ignition feedback control is operated when the renewal of the air mass correction value eqgaadj of the air intake mass is performed at step S7 (following the Yes branch of step S2). The engine cannot be controlled under an identical condition if the engine speed (idle speed) changes each time when the desired air mass is related to the measured air mass. Hence, in step S7, the engine speed is necessarily controlled to a desired value by the ignition feedback control. In steps S5 to S7, only a relationship between the air mass and the ignition timing is controlled under a steady condition of the engine speed.

As described above, the correction for increasing the air intake mass (step S7) is performed (step S5, Yes) only when the ignition feedback correction mass eanefb is larger than zero when the ignition timing is advance-controlled by the ignition feedback control. On the other hand, the correction for increasing the air intake mass is not performed (step S5, No, step S6) when the ignition feedback correction mass eanefb is less than or equal to zero when the correction mass of the ignition timing is zero or when the ignition timing is retard-controlled.

Figure 2:
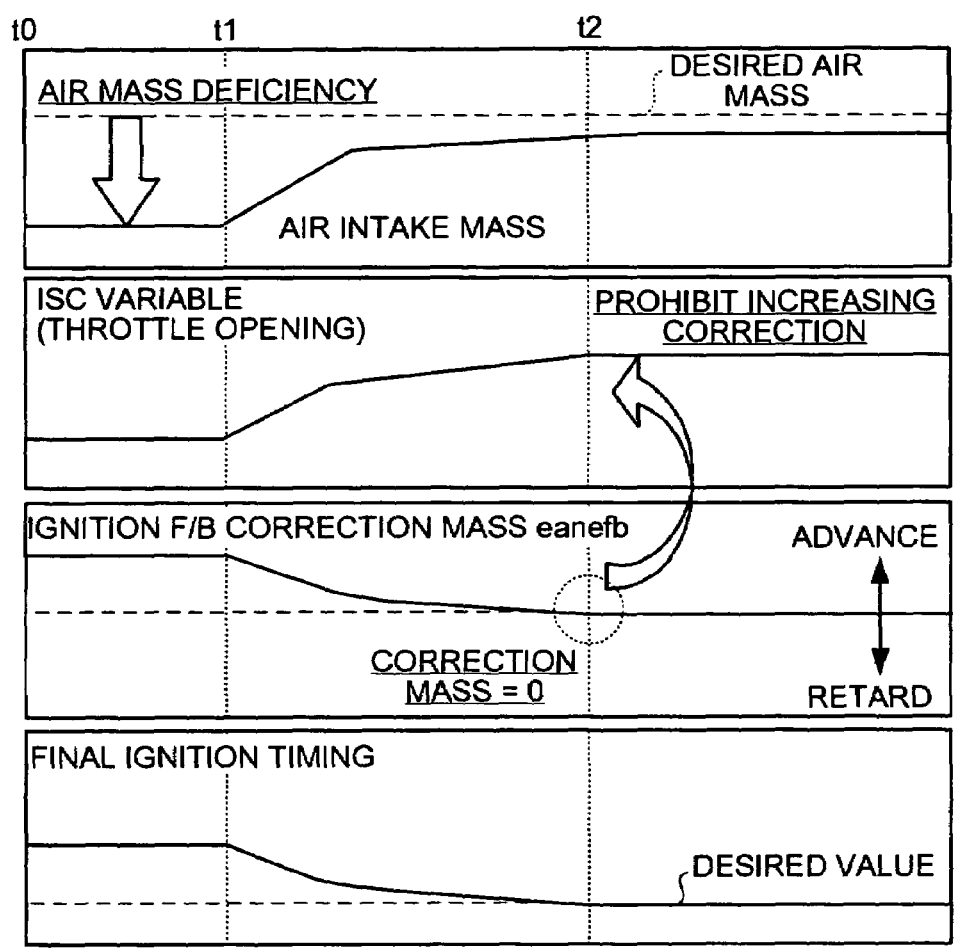
FIG. 2 is a graph showing the operation of the first embodiment of the internal combustion engine control apparatus of the present invention.

As shown in FIG. 2, the ignition timing is advanced by the ignition feedback control in such a way that the engine speed converges to the desired value at t0 where the ignition feedback correction mass eanefb has a positive value. Hence, the engine speed has a lower value compared to the desired value when, for example, the ignition timing is not advanced at t0. The engine speed is lower than the desired value when, for example, the ignition timing is not advanced and when the air mass measured by the AFM is less than the desired air mass at t0 because the air intake mass is insufficient. Therefore, the air intake mass is increased, and accordingly the advance mass of the ignition timing (ignition feedback correction mass eanefb) is decreased. That is to say, the ignition feedback control is relatively controlled to the retarded side (the ignition feedback correction mass eanefb is decreased) since the output torque is increased and the engine speed is tend to increase due to the correction for increasing the air intake mass from t1 (step S5, Yes, step S7).

As described above, the correction for increasing the air intake mass is performed as well as the ignition feedback control is relatively controlled to the retarded side. Then, the increasing of the air intake mass is prohibited (step S6) when the ignition feedback correction mass eanefb becomes zero at t2 (step S5, No). That is to say, the increasing of the air intake mass is prohibited (step S6) when the ignition feedback correction mass eanefb becomes zero (step S5, No) even when the air mass measured by the AFM is less than the desired air mass. The reason is explained hereinafter.

The AFM might, for example, includes substantially ±5% of the manufacturing error. In the present embodiment, the correction for increasing the air intake mass is based on the value measured by the AFM (step S7). Consequently, more air mass corresponding to the manufacturing error of the AFM with respect to the desired air mass might be sucked. Hence, the engine speed is increased with respect to the desired value, or the ignition timing is controlled to the retarded side with respect to the desired value in order to suppress the increase of the engine speed. Therefore, in the present embodiment, the excessive increase in the air intake mass is prohibited (step S6) when the ignition timing reaches to the desired value (the ignition feedback control mass eqnefb is zero).

That is to say, the correction for increasing the air intake mass is not performed while having a negative value of the ignition feedback correction mass (the ignition timing being retarded, the final ignition timing being set to the retarded side with respect to the desired value) due to the excessive correction. The engine speed is stabilized at the desired value by performing the ignition feedback control. Further, the ignition timing is stabilized at the desired value by prohibiting (step S6) to increase the air intake mass when the ignition feedback correction mass becomes zero (step S5, No). Consequently, the engine speed and the ignition timing are both stabilized at the desired value. There is no problem even if the value measured by the AFM is less than the desired air mass, as long as the engine speed and the ignition timing are both stabilized at the desired value. The control cycle proceeds to step S8 after step S7.

After the value of the correction mass of the air intake mass eqgaadj is limited to a value of greater than or equal to zero in step S8, the correction mass of the air intake mass eqgaadj is added to the ISC variable eqcalb in step S9. Then, the addition is obtained as the ISC variable (eqcal). The throttle opening (ISC variable) is controlled by the ISC variable (eqcal) obtained in step S9. Consequently, the throttle opening is adjusted by the correction mass of the air intake mass eqgaadj; therefore, the actual air mass sucked is corrected in such a way that the air mass reaches to the desired air mass. The control cycle proceeds back to step S1 after step S9.

In step S10, it is determined whether or not the air mass correction value eqgaadj (step S7) has been calculated. The No branch of step S2 is taken when the ignition feedback control is ended or when the ignition feedback control is not performed since the temperature is high enough so that the catalytic warm up is not necessary at the start of the engine. When the ignition feedback control is not performed due to the high enough temperature as described above, the Yes branch has never been taken from step S2, so that the air mass correction value eqgaadj has never been calculated. Hence, the No branch of step S10 is taken, and the air mass correction value eqgaadj is set to zero at step S14. On the other hand, when the ignition feedback control is ended, the Yes branch of step S10 is taken since the air mass correction value eqgaadj is calculated. Then the control cycle proceeds to step S11.

In step S11, the reflection coefficient K is calculated, and the correction mass of the air intake mass is determined based on the calculated reflection coefficient K. As described above, the error in the air intake mass is caused due to the property of the ISC, the property of the throttle valve, and the like (including the change over time), and the error is mainly changed due to the opening of the valve. Therefore, the reflection coefficient K in which the influence of the throttle property is reflected is calculated in order to take in account of the influence of the throttle property, and the correction mass of the air intake mass is determined based on the calculated reflection coefficient K.

The reflection coefficient K is calculated based on the ISC variable. That is to say, the reflection coefficient K is determined based on the ISC variable (eqcalb) at when the air mass correction mass is calculated. Here, the ISC variable is memorized as data eqbase as described above in step S4. Specifically, a ratio between the current (while performing step S11) ISC variable eqcalb and data eqbase described above, eqcalb/eqbase, is reflected, and the ratio of the ISC opening, eqcalb/eqbase is obtained as the reflective coefficient K.

That is to say, the reflective coefficient K is, K=eqcalb/eqbase. The reflective coefficient K has a value less than or equal to one, and the reflective coefficient K has a function of reducing the correction mass of the air intake mass eqgaadj.

Specific values are used to explain the present embodiment hereinafter. Here, the values are used only to simplify the explanation, and the values do not represent any specific physical quantities. For example, the ISC variable is calculated so that eqcalb is equal to 10, at step S1 of the control cycle at the cold start. Then, at step S3, the difference (for example, 2) between the desired air mass (value: 10) and the value measured by the AFM (for example, 8) is calculated as the Δqga since the ignition feedback control has been operated (step S2, Yes). At step S4, eqcalb described above (this is 10 in the present example) is memorized as eqbase. Then, the ISC opening eqcal is controlled after steps S5 to S8 (step S9). When the engine water temperature ethw is increased as the control cycle proceeds the warm up process (consequently, the ignition feedback control being ended), the ISC variable is obtained so that eqcalb is, for example, equal to 5. Then, it is determined that the ignition feedback control is not operated (step S2, No). When the Yes branch of step S10 is taken, the reflection coefficient is obtained at step S11 so that K=eqcalb/eqbase=5/10=½. As the reflection coefficient K is multiplied, the reflection coefficient K functions as to decrease the correction mass of the air intake mass eqgaadj. For example, when the correction mass of the air intake mass eqgaadj of the previous control cycle is 2 when the value is the same as the value of the Δqga, the correction mass of the air intake mass eqgaadj is multiplied by ½ that is the reflection coefficient K, and the correction mass of the air intake mass becomes 1. As described above, the influence of the throttle property can be reflected onto the correction mass of the air intake mass eqgaadj when the control for decreasing the air intake mass is performed (step S10, Yes) by the reflection coefficient K after the ignition feedback control is ended (step S2, No).

Figure 3:
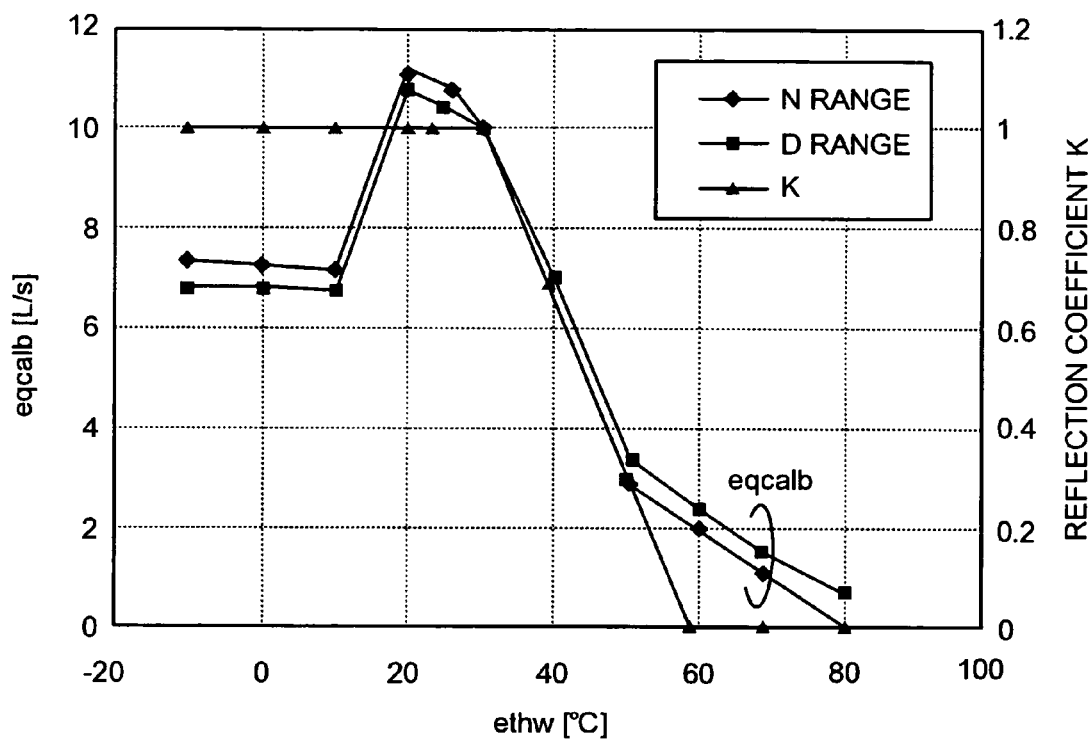
FIG. 3 is a graph showing a relationship between an engine water temperature and an ISC opening of the operation of the first embodiment of the internal combustion engine control apparatus of the present invention.

FIG. 3 shows a relationship between the engine water temperature and the ISC opening. In FIG. 3, the reflection coefficient K is the ratio of the ISC opening, eqcalb/eqbase, and a maximum value thereof is 1.0. The numerator of the ratio, eqcalb, and the engine water temperature ethw are substantially correlated with each other as shown in FIG. 3 (see N range and D range in FIG. 3). Hence, the reflection coefficient K can be obtained based on the engine water temperature ethw (see FIGS. 3 and 4) instead of the ratio of the ISC opening, eqcalb/eqbase. The reflection coefficient K can be obtained easily since a calculation is unnecessary for obtaining the reflection coefficient K based on the engine water temperature ethw instead of the ratio of the ISC opening, eqcalb/eqbase.

Figure 4:
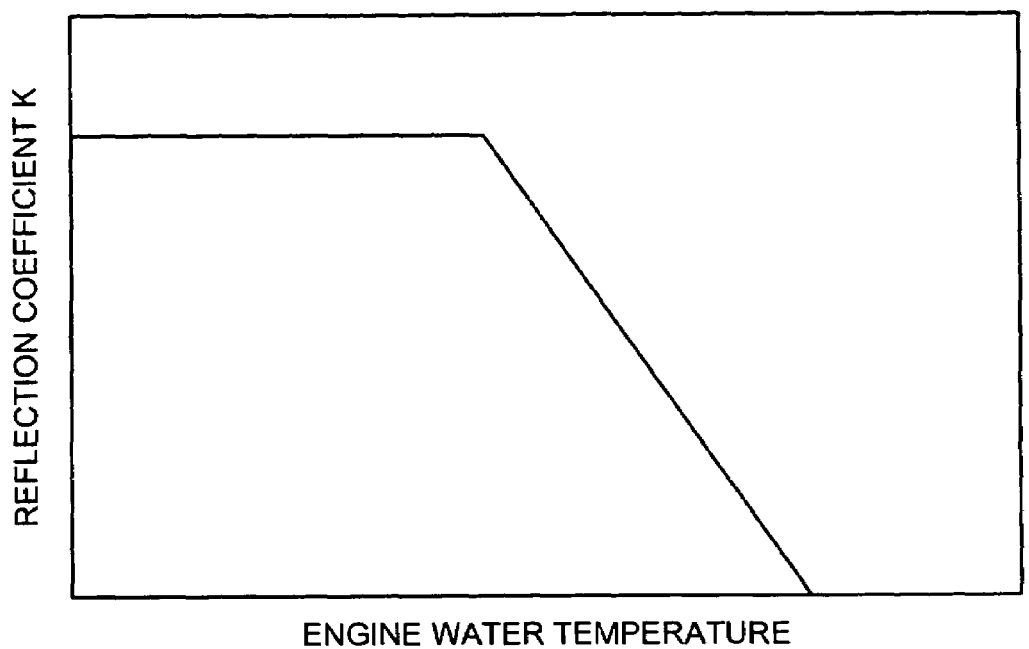
FIG. 4 is a graph showing a relationship between the engine water temperature and a reflection coefficient of the operation of the first embodiment of the internal combustion engine control apparatus of the present invention.

As shown in FIGS. 3 and 4, the reflection coefficient K becomes small as the warm up proceeds and the engine water temperature increases so that the ignition feedback control ends (step S2, No, step S10, Yes). Consequently, the correction mass of the air intake mass eqgaadj becomes small. The control cycle proceeds to step S12 after step S11.

In step S12, it is determined that whether or not the difference between the current engine speed ene and the desired engine speed entcal is larger than at least a predetermined value. As a result, when the difference is larger than the predetermined value, the control cycle proceeds to step S13. In step S13, a predetermined decreasing mass (DEC) is subtracted from the correction mass of the air intake mass eqgaadj determined at step S11, and the value just calculated becomes the correction mass of the air intake mass eqgaadj. Here, the predetermined decreasing mass (DEC) is a fixed constant that is independent of any parameters. Even though not shown in FIG. 1, step S13 is performed when the difference between the current engine speed ene and the desired engine speed entcal is larger than the predetermined value for a predetermined time period in step S12 of FIG. 1. The control cycle proceeds to S8 after step S13, or proceeds to S8 when step S12 is negated.

In step S8, the air mass correction control is limited to an increasing side (correction to the decreasing side being not performed) because the air intake mass is deficient compared to the normal product due to adherence of a deposit and the like when the throttle valve is changed over time, as described above with reference to FIG. 6.

The engine speed does not exceed the desired value while performing the ignition feedback control (step S2, Yes) since the ignition timing is feedback-controlled in such a way that the engine speed reaches to the desired value. Further, the exceeding of the engine speed with respect to the desired value due to the increase of the air intake mass is not caused since the correction for increasing the air intake mass is prohibited by steps S5 and S6 when the ignition timing tends to move to the retarded side with respect to the desired value.

On the other hand, the air mass correction (step S9) is performed after the ignition feedback control (step S2, No) while decreasing the correction mass of the air intake mass eqgaadj by the reflection coefficient K at step S1. Here, an inconvenient condition (engine vibration, overrun, and the like) arises since the engine speed ene largely exceeds the desired engine speed entcal due to an influence such as a disturbance. Further, the inconvenient condition is caused when the reflection coefficient K cannot be corresponded due to a sudden change of the throttle property at a certain opening by the adherence of the deposit, or when an excessive air intake mass is held at a region, in which the engine water temperature ethw is at a middle thereof and the reflection coefficient K is suddenly changed. Steps S12 and S13 are operations that prepare to suppress the conditions described above.

That is to say, in step S13, the predetermined mass DEC is subtracted from the correction mass of the air intake mass eqgaadj for treating the condition described above, and a new value after the subtraction becomes a new correction mass of the air intake mass eqgaadj. That is to say, the correction mass of the air intake mass eqgaadj is decreased by the predetermined mass DEC, or the correction mass eqgaadj is recalculated (reflection process). As described above, the correction mass of the air intake mass is decreased by the predetermined mass DEC so that the engine speed ene reaches to the desired engine speed entcal.

After the ignition feedback control (step S2, No), the ISC variable (air intake mass) is feedback-controlled in such a way that the engine speed becomes the desired value. Hence, the engine speed can be stabilized to the desired value by the feedback control of the ISC variable when a variation between the engine speed and the desired value is small. However, the large excess in the engine speed with respect to the desired value by having the excess air intake mass due to the influence of the disturbance and the like is inconvenient. Hence, the predetermined mass DEC is subtracted form the correction mass of the air intake mass eqgaadj when there is the correction mass of the air intake mass eqgaadj (step S10, Yes), and the value after the subtraction becomes the new correction mass of the air intake mass eqgaadj (step S13).

The following effect can be obtained from the present embodiment described above.

The internal combustion engine control apparatus 10 calculates the correction mass of the air intake mass (Δqga, eqgaadj) based on the desired value of the air intake mass and the measured value of the air intake mass at the idle state after the start of the engine. Further, the internal combustion engine control apparatus 10 controls the air intake mass based on the calculated correction mass (Δqga, eqgaadj). The internal combustion engine control apparatus 10 controls the air intake mass (steps S11, S9) based on the ISC variable (eqcalb, step S1) including the throttle opening or the ISC valve opening corresponding to the desired value of the air intake mass, and based on the ISC variable when the correction mass (Δqga) is calculated. Hence, the correction mass of the air intake mass can be set to a more appropriate value even when the air intake mass is decreased by the property of the ISV or the property of the throttle valve (change over time) and when the error thereof is different due to the opening of the valve.

The internal combustion engine control apparatus 10 calculates the correction mass of the air intake mass (Δqga, eqgaadj) based on the measured value of the air intake mass at the idle state after the start of the engine, and the internal combustion engine control apparatus 10 controls the air intake mass based on the calculated correction mass (Δqga, eqgaadj). In addition to the above effect, the internal combustion engine control apparatus 10 can set the correction mass of the air intake mass to the more appropriate value by more simple process since the air intake mass is controlled (steps S11 and S9) based on the water temperature ethw of the internal combustion engine.

In the internal combustion engine control apparatus 10, the control variable (eqgaadj) of the air intake mass is decreased (step S13) when the internal combustion engine speed (ene) is greater than or equal to the desired speed (entcal) by the predetermined value (step S12, Yes). Hence, the air intake mass can be decreased even when the engine speed tends to largely excess the desired value by the excess intake air mass due to the influence of the disturbance and the like. Consequently, the engine speed can reach to the desired value.

The internal combustion engine control apparatus 10 calculates the correction mass of the air intake mass (Δqga, eqgaadj) based on the measured value of the air intake mass at the idle state after the start of the engine, and the internal combustion engine control apparatus 10 controls the air intake mass based on the calculated correction mass (Δqga, eqgaadj). The internal combustion engine control apparatus 10 prohibits the control for increasing the air intake mass (steps S6 and S7) when the feedback control mass of the ignition timing has the value on the retarded side (step S5, No) while feedback-controlling (step S2, Yes) the ignition timing in such a way that the internal combustion engine speed converges to the desired value. Hence, the excess correction of the air intake mass is suppressed when the measuring instrument for directly measuring the actual air intake mass has the error (including manufacturing error), and the ignition timing can be stabilized at the desired value.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An internal combustion engine control apparatus, comprising:
   a controller which controls an air intake mass during a first state while an ignition feedback control is in operation based on a correction mass of the air intake mass calculated based on a desired value of the air intake mass and a measured value of the air intake mass,
   wherein the controller controls the air intake mass during a second state while the ignition feedback control is not in operation based on
      an idle speed control variable corresponding to the desired value of the air intake mass at any given time, and
      an idle speed control value corresponding to a value of the idle speed control variable at a time when the correction mass is calculated,
      both the idle speed control variable and the idle speed control value including a degree of a throttle opening or a degree of an idle speed control valve opening.

2. The internal combustion engine control apparatus according to claim 1, wherein
   both the idle speed control variable and the idle speed control value include a degree of opening of an electronic throttle as the degree of the throttle opening.

3. The internal combustion engine control apparatus according to claim 1, wherein
   both the idle speed control variable and the idle speed control value include a degree of opening of a mechanical throttle as the degree of the throttle opening.

4. The internal combustion engine control apparatus according to claim 1, wherein
   the air intake mass is further controlled based on a water temperature of the internal combustion engine.

5. The internal combustion engine according to claim 1, wherein
   a control variable of the air intake mass is decreased when a rotational speed of the internal combustion engine is greater than a desired rotational speed by at least a predetermined value.

6. The internal combustion engine control apparatus according to claim 1, wherein
   a control for increasing the air intake mass is prohibited when a rotational speed of the internal combustion engine converges to a desired value as a result of a feedback correction mass of an ignition timing being retarded during the first state.

7. The internal combustion engine control apparatus according to claim 6, wherein
   the air intake mass is further controlled based on a water temperature of the internal combustion engine.

8. The internal combustion engine control apparatus according to claim 6, wherein
   a control variable of the air intake mass is decreased when a rotational speed of the internal combustion engine is greater than a desired rotational speed by at least a predetermined value.

9. The internal combustion engine control apparatus according to claim 1, wherein
a control for increasing the air intake mass is prohibited when a feedback correction mass of an ignition timing converges to a non-negative desired value as a result of the feedback correction mass of the ignition timing being retarded during the first state.

10. An internal combustion engine control apparatus, comprising:
a controller which controls an air intake mass during a first state while an ignition feedback control is in operation based on a correction mass calculated based on a measured value of the air intake mass,
wherein the controller controls the air intake mass such that increasing the air intake mass is prohibited when a feedback correction mass of the ignition timing is equal to zero and a rotational speed of the internal combustion engine converges to a desired value as a result of a feedback correction mass of an ignition timing being retarded during the first state while the ignition feedback control is in operation.

11. The internal combustion engine according to claim 10, wherein
the air intake mass is controlled based on a water temperature of the internal combustion engine.

12. The internal combustion engine according to claim 10, wherein
a variable of the air intake mass is decreased when a rotational speed of the internal combustion engine is greater than a desired rotational speed by at least a predetermined value.

13. A method of controlling an air intake quantity comprising:
controlling the air intake mass during a first state while an ignition feedback control is in operation based on a correction quantity calculated based on a desired value of the air intake quantity and a measured value of the air intake quantity; and
controlling the air intake quantity during a second state while the ignition feedback control is not in operation based on an idle speed control variable corresponding to the desired value of the air intake quantity at any given time and an idle speed control value corresponding to a value of the idle speed control variable at a time when the correction mass is calculated, both the idle speed control variable and the idle speed control value including a degree of a throttle opening or a degree of an idle speed control valve opening.

14. The method according to claim 13, the method further comprising
controlling the air intake mass based on a water temperature of the internal combustion engine.

15. A method of controlling an air intake mass, after a start of an internal combustion engine comprising
controlling an air intake mass during a first state while an ignition feedback control is in operation based on a correction mass calculated based on a measured value of the air intake mass; and
prohibiting an increase in the air intake mass when a feedback correction mass of the ignition timing is equal to zero and a rotational speed of the internal combustion engine converges to a desired value as a result of a feedback correction mass of an ignition timing being retarded during the first state while the ignition feedback control is in operation.

16. An internal combustion engine control apparatus, comprising:
a controller which controls an air intake mass during a first state while an ignition feedback control is in operation based on a correction mass calculated based on a measured value of the air intake mass,
wherein the controller controls the air intake mass such that increasing the air intake mass is prohibited when a feedback correction mass of an ignition timing converges to a desired non-negative value as a result of the feedback correction mass of the ignition timing being retarded during the first state while the ignition feedback control is in operation.

* * * * *